(12) United States Patent
Richardson

(10) Patent No.: US 9,750,964 B2
(45) Date of Patent: *Sep. 5, 2017

(54) FIRE HOSE COUPLING WITH DIRECTIONAL INDICATOR

(71) Applicant: MERCEDES TEXTILES LTD., St. Laurent (CA)

(72) Inventor: Robert Richardson, Cookshire (CA)

(73) Assignee: Mercedes Textiles Ltd., St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,911

(22) Filed: Oct. 21, 2016

(65) Prior Publication Data

US 2017/0036047 A1 Feb. 9, 2017

Related U.S. Application Data

(63) Continuation of application No. 13/255,640, filed as application No. PCT/CA2010/000437 on Mar. 24, 2010, now Pat. No. 9,539,449.

(60) Provisional application No. 61/165,085, filed on Mar. 31, 2009.

(51) Int. Cl.
*F16L 19/00* (2006.01)
*A62C 33/00* (2006.01)
*F16L 37/252* (2006.01)

(52) U.S. Cl.
CPC .............. *A62C 33/00* (2013.01); *F16L 19/00* (2013.01); *F16L 37/252* (2013.01); *F16L 2201/60* (2013.01); *Y10T 137/0402* (2015.04)

(58) Field of Classification Search
CPC .................................. A62C 33/00; F16L 35/00
USPC ............................................................ 285/93
See application file for complete search history.

(56) References Cited

U.S. PATENT DOCUMENTS

| 489,107 | A | 1/1893 | Storz |
| 1,650,996 | A | 11/1927 | McDonnell |
| 1,978,245 | A | 10/1934 | Barker |
| 2,787,975 | A | 4/1957 | Dunn |
| 2,926,027 | A | 2/1960 | Marquis, Jr. |
| 4,401,050 | A | 8/1983 | Britt et al. |
| 4,844,000 | A | 7/1989 | Clement |
| D312,390 | S | 11/1990 | Clement |
| D345,519 | S | 3/1994 | Clement |
| D345,520 | S | 3/1994 | Clement |
| 5,402,592 | A | 4/1995 | Caveney et al. |
| 5,623,890 | A | 4/1997 | Lenske |
| D382,501 | S | 8/1997 | Clement |
| 6,079,135 | A | 6/2000 | Ruiz |
| 6,766,761 | B1 | 7/2004 | Tamez, Jr. et al. |

(Continued)

*Primary Examiner* — David E Bochna
(74) *Attorney, Agent, or Firm* — Ware, Fressola, Maguire & Barber LLP

(57) ABSTRACT

A fire hose coupling comprises a body having a first end connected to a fire hose and a second end having either male or female threads or, alternatively, a quarter-turn sexless coupler. The fire hose coupling comprises a recessed portion formed in an outer surface of the body. The recessed portion is shaped to define a visuotactile directional indicator such as an arrow. The recessed portion may include a light-reflecting surface to enhance visibility such as a super reflective metal film, a photo luminescent coating, or a phosfluorescent coating. The recessed directional indicator may be formed in female, male or sexless (Storz) couplings.

6 Claims, 1 Drawing Sheet

(56) References Cited

U.S. PATENT DOCUMENTS

| | | | |
|---|---|---|---|
| 7,640,884 B2 | 1/2010 | Tamez, Jr. | |
| 7,942,544 B2 * | 5/2011 | Smathers | |
| 9,057,353 B2 * | 6/2015 | Aubuchon, Sr. | F03B 13/10 |
| 9,518,690 B2 * | 12/2016 | Belisle | F16L 35/00 |
| 9,539,449 B2 * | 1/2017 | Richardson | A62C 33/00 |
| 2002/0011730 A1 | 1/2002 | Stickan | |
| 2004/0201215 A1 | 10/2004 | Steingass | |
| 2007/0063512 A1 * | 3/2007 | Tamez, Jr. | F16L 19/02 |
| | | | 285/93 |
| 2009/0120350 A1 | 5/2009 | Tamez, Jr. | |
| 2009/0188138 A1 | 7/2009 | Murphy | |
| 2012/0211974 A1 * | 8/2012 | Richardson | A62C 33/00 |
| | | | 285/93 |

\* cited by examiner

FIRE HOSE COUPLING WITH DIRECTIONAL INDICATOR

CROSS-REFERENCE TO RELATED APPLICATIONS

This application is a continuation of U.S. application Ser. No. 13/255,640 filed on Sep. 9, 2011, which issued as U.S. Pat. No 9,539,449 on Jan. 10, 2017 and which is the U.S. National Stage of International Application Number PCT/CA2010/000437 filed on Mar. 24, 2010, which was published on Oct. 7, 2010 under International Publication Number WO2010/111773, and which claims the benefit of U.S. Provisional Patent Application No. 61/165,085 filed on Mar. 31, 2009, which are each hereby incorporated by reference in their entirety.

TECHNICAL FIELD

The present technology relates generally to couplings and, in particular, to fire hose couplings.

BACKGROUND

Fire hoses are coupled together with fire hose couplings. These couplings are well known in the art. Typically, one side of a coupling has an expansion ring to attach the coupling to its respective hose. On the other side of the coupling are usually a set of internal or external threads for fastening the coupling to complementary (external or internal) threads of another coupling. In addition to these male and female couplings, there also exist so-called "sexless couplings" or Storz coupling (see U.S. Pat. No. 0,489,107). Usually, a fire truck is provided with a male connector to which a female coupling is fastened. A fire hose assembly is then concatenated by coupling together sequential male and female couplings.

Firefighters operating in dark and smoke-filled environments are prone to becoming disoriented. In conditions of poor visibility, it is extremely helpful to have some means for the firefighter to determine which way leads to the exit, i.e. which hose direction leads back toward the fire truck. Firefighters may be taught to seek out, for example, the female coupling of the connection as an indicator that this side of the connection leads back to the fire truck. However, this method is not satisfactory because a firefighter, in the heat of the moment, may not remember which coupling points back to the fire truck or he may not be able to properly see or feel the couplings. Furthermore, the fire hoses may not have been assembled in the expected (conventional) way, and thus reliance on the assumption that, for example, the female coupling, leads back to the fire truck, may in fact lead the firefighter to head the wrong direction. As will be appreciated, these issues are a matter of life and death to firefighters. Improvements on conventional techniques are thus extremely important.

To address the aforementioned problems, a number of different bands, clamps, and collars have been developed for sliding over fire hoses to indicate the direction to safety. For example, U.S. Pat. No. 6,079,135 (Ruiz) discloses a flexible identification collar for hoses. U.S. Pat. No. 4,844,000 and U.S. Design Pat. Nos. 382,501; 345,520; 345,519 and 312,390 (all to Clement) disclose direction-indicating bands for attaching to firefighting hoses. These slide-on devices are inherently problematic because they represent an additional component to be assembled to the hose, thus slowing down the assembly of the fire hose when time is of the essence. Furthermore, these external bands, clamps, etc. may catch or snag on objects (e.g. ledges, nails, splintered wood, etc.) as the hose is dragged through the burning building. Moreover, they may slide down the hose, out of reach and out of sight.

In a similar vein is a fire hose directional indicator disclosed by Tamez, Jr. et al. in U.S. Pat. No. 6,766,761. This gasket-like annular body fits over the male threads of the male coupler and is captured between the threads of the abutting male and female couplers. The disadvantage of this device is that it represents a further component that has to be assembled. The coupling only has tactile indicator extensions that require a firefighter to feel the direction to safety. If the device is out of the firefighter's reach, it may be of limited utility, particularly in conditions of poor visibility.

Also known in the art are various fire hose couplings with directional indicators. These offer the advantages of not requiring assembly of additional components and not being prone to slide up and down the hose out of reach and out of sight.

For example, U.S. Pat. No. 5,623,890 (Lenske) which discloses a fire hose coupling with directional finger-like extensions. An embossed word ("EXIT") is provided on the extensions. This provides both visual and tactile indication to the firefighter of the direction of the exit. The Lenske coupling requires that the firefighter either feel the direction of the finger-like extensions or be able to see the finger-like extension with the embossed word "EXIT". If the firefighter is not within reach of the coupling or if the firefighter cannot see the coupling due to poor smoke, darkness or other vision-impairing reasons, the device cannot inform the firefighter of the direction to safety. One disadvantage of having an embossed word exposed on the outer surface of the extensions is that the embossed word is prone to abrasion and wear. Over time, the embossed word may become so worn as to be illegible. Furthermore, the extensions may not only cause the hose to hang up (snag or catch) when dragged but also trap or collect hot debris under the extensions causing spot burn throughs. A further problem with these extensions is that, when the hose is slack, i.e. not filled with water, the extensions may puncture or damage the hose when folded or rolled tightly for storage.

Accordingly, a need remains for an improved fire hose coupling that addresses one or more of the deficiencies of the aforementioned prior art.

SUMMARY

In general, the present invention provides a fire hose coupling having a directional indicator for indicating a direction to safety (i.e. the direction to the exit). This directional indicator assists firefighters who may become disoriented in conditions of poor visibility. The coupling has a substantially annular body that includes a recessed, or "sunken", portion formed in the outer surface of the body. Since the recessed portion is both visual and tactile (i.e. can be both seen and felt, even through thick firefighter gloves), this directional indicator is said to be "visuotactile". This visuotactile indicator may be shaped like an arrow, for example, or like any other readily recognizable symbol.

The recessed portion of the coupling may contain a light-reflecting surface to enhance visibility. This light-reflecting surface may be made of a super reflective, photo luminescent or phosfluorescent material. Other coatings, paints, tapes, films, etc. that provide extremely high reflectivity or brightness may be used as well. This light-reflecting surface makes the directional indicator more likely to be seen in conditions of poor visibility (e.g. in a dark or smoke-filled environment). In addition to an arrow or other such symbol, the coupling may include an engraved word (or word with recessed lettering) such as, for example, "EXIT" or "OUT" (or other foreign-language words appropriate to the local language understood by the firefighters using the couplings).

Thus, a main aspect of the present invention is a fire hose coupling comprising a substantially annular body having a first end for connecting to a fire hose and a second end having threads or a quarter-turn coupler for connecting to another coupling, and a recessed portion formed in an outer surface of the coupling body, the recessed portion shaped to define a visuotactile directional indicator.

In embodiments of the invention, the recessed portion defining the directional indicator contains a light-reflecting surface for enhancing visibility of the directional indicator. This is useful for firefighters operating in conditions of poor visibility (e.g. a dark and smoke-filled room or corridor). The recessed portion not only protects the light-reflecting surface from wear and abrasion, but it also minimizes the chance of the coupling catching or snagging on some object as the fire hose is dragged through a burning building.

Another aspect of the present invention is a fire hose assembly comprising a first fire hose having a first coupling and a second fire hose having a second coupling adapted to be mechanically coupled to the first coupling. One or both of the first and second coupling comprises a recessed portion formed in an outer surface of a body of the coupling. This recessed portion is shaped to define a visuotactile directional indicator.

Yet another aspect of the present invention is a method of indicating a direction of exit when assembling fire hoses. The method entails providing a first fire hose having one end adapted to connect to a fire truck and another end having a first coupling and providing a second fire hose having a nozzle at one end and a second coupling at another end that is adapted to be mechanically coupled to the first coupling. One or both of the first coupling and the second coupling comprises a visuotactile directional indicator formed as a recessed portion in an outer surface of a body of the coupling. The method further involves coupling the first and second couplings such that the one or more directional indicators points toward the fire truck, thereby indicating the direction of exit.

The details and particulars of these aspects of the invention will now be described below, by way of example, with reference to the attached drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present invention provides a fire hose coupling with a directional indicator. The directional indicator is designed to indicate a direction to safety (i.e. the direction to the exit). In other words, the directional indicator points the firefighter toward the fire truck, which thus leads the firefighter out of the burning building or other structure. This directional indicator assists firefighters who may become disoriented, confused or lost in conditions of poor visibility such as for example in a dark and smoke-filled room, corridor or other location.

This novel coupling (or "coupler") has a substantially annular body that includes a recessed, or "sunken", portion formed in the outer surface of the body. The recessed or sunken portion thus defines a depressed area or cavity in the body of the coupling into which a symbol (e.g. an arrow) and/or a word (e.g. "EXIT") may be provided for enhancing visibility of the directional indicator for the firefighter.

Since the recessed portion is both visual and tactile (i.e. can be both seen and felt, even through thick firefighter gloves), this directional indicator is said to be "visuotactile". This visuotactile indicator may be shaped like an arrow, for example, or like any other readily recognizable symbol that is easily discerned either visually and/or tactilely (by touch).

The recessed portion of the coupling may contain a light-reflecting surface to enhance visibility. This light-reflecting surface may be made of a super reflective, photo luminescent or phosfluorescent material (e.g. fluorescent tape). Other coatings, paints, tapes, metallic films, etc. that provide extremely high reflectivity or brightness may be used as well. As will be appreciated, various combinations of light-reflecting materials may be used to achieve any desired visual effect. This light-reflecting surface makes the directional indicator more likely to be seen in conditions of poor visibility (e.g. in a dark or smoke-filled environment). In addition to an arrow or other such symbol, the coupling may include an engraved word (or word with recessed lettering) such as, for example, "EXIT" or "OUT" (or other foreign-language words appropriate to the local language understood by the firefighters using the couplings).

Figure 1:
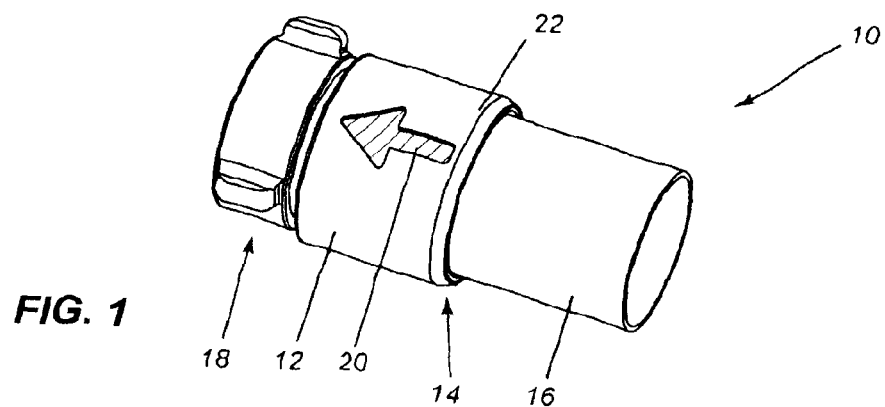
FIG. 1 is a perspective view of a female fire hose coupling in accordance with an embodiment of the present invention.

FIG. 1 is a perspective view of a female coupling designated by reference numeral 10 in accordance with one embodiment of the present invention. As shown by way of example, this coupling 10 has a substantially annular body 12 having a first end 14 connected to a fire hose 16 and a second end 18 having threads. A recessed portion 20 is formed in an outer surface 22 of the coupling body 12. The recessed portion 20 is shaped to define a visuotactile directional indicator. In this particular example, the visuotactile directional indicator is shaped like an arrow. Other symbol or shapes may be substituted such as, for example, a sideways V ("<") or a series of sideways V's ("<<<").

The recessed portion 20 may have a light-reflecting surface to enhance visibility of the directional indicator.

The light-reflecting surface inside the recessed portion 20 may be made of a super reflective metal film, a photo luminescent coating, or a phosfluorescent coating. Other paints, coatings, films, etc. having extremely high reflectivity or brightness may be used.

Optionally, in addition to an arrow or other such symbol, the coupling may include an engraved word (or word with recessed lettering) such as, for example, "EXIT" or "OUT" (or other foreign-language words appropriate to the local language understood by the firefighters using the couplings).

Optionally, the substantially annular body 12 has a plurality of recessed portions 20. This helps to ensure that at least one directional indicator is always visible irrespective of the position (or lie) of the coupling. As a specific example, the substantially annular body may have three directional indicators on the outer surface of the coupling. As will be appreciated, any number of directional indicators may be used provided they remain large to be readily visible.

Figure 2:
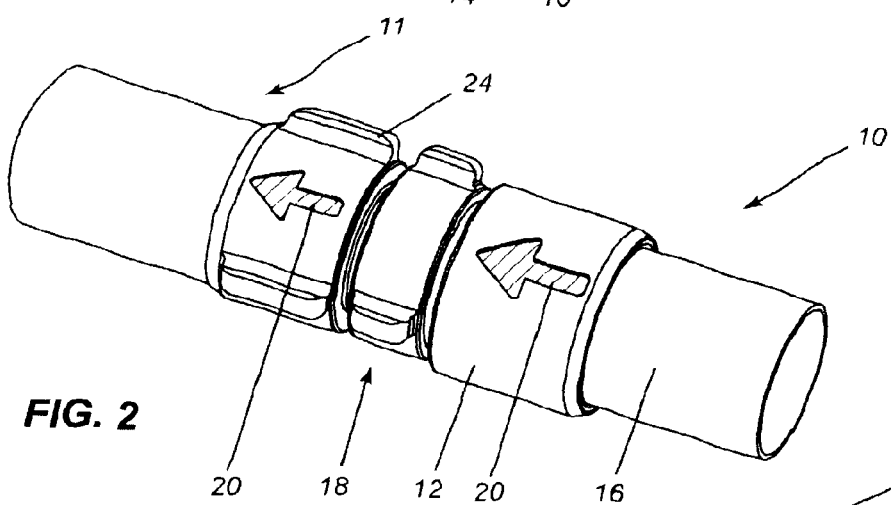
FIG. 2 is a perspective view of a male fire hose coupling connected to a female fire hose coupling in accordance with an embodiment of the present invention.

FIG. 2 is a perspective view of a male fire hose coupling 11 connected to a female fire hose 10 coupling in accordance with an embodiment of the present invention. The female coupling 10 is the same as described above. The male coupling has external threads for connecting to complementary internal threads on the female coupling. As shown by way of example in FIG. 2, both the female coupling 10 and the male coupling 11 have directional indicators. It is possible, however, to have the directional indicators on only the male coupling or on only the female coupling. As shown in FIG. 2, the visuotactile directional indicator is formed by the recessed portion 20 located in the outer surface of the annular body.

In one embodiment, as shown by way of example in FIG. 2, one recessed portion (directional indicator) is disposed between each adjacent pair of lugs 24 that extend radially outwardly from the substantially annular body. In this specific example, the annular body has three lugs 24. Three arrow-shaped directional indicators are provided between each adjacent pair of lugs. This disposition of directional indicators ensures that at least one directional indicator is visible irrespective of the lie of the coupling (i.e. regardless of how the coupling is positioned).

Figure 3:
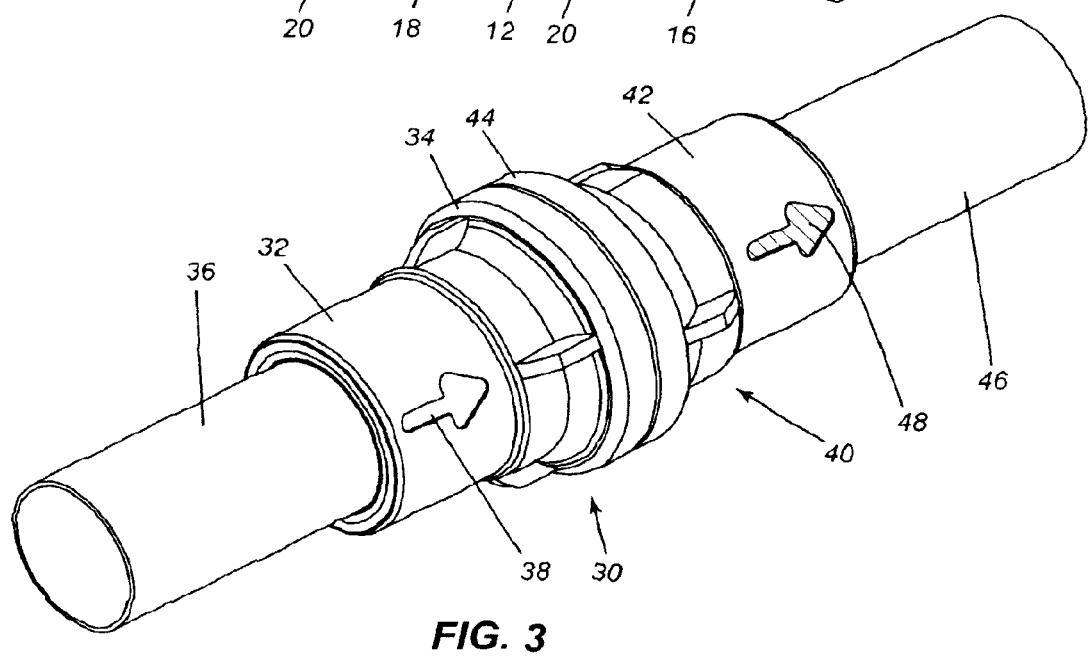
FIG. 3 is a perspective view of a Storz (sexless) coupling having differently coloured directional arrows in accordance with another embodiment of the present invention.

FIG. 3 is a perspective view of a Storz (sexless) coupling having differently coloured directional arrows in accordance with another embodiment of the present invention. As shown in FIG. 3, the coupling is composed of a first sexless coupling 30 and a second sexless coupling 40. The first sexless coupling 30 includes a first coupling body 32 having a first coupler 34. The second sexless coupling 40 includes a second coupling body 42 having a second coupler 44. These Storz or sexless couplings are also referred to as quarter-turn couplings in the industry. On the first coupling body 30 is a first directional arrow 38. On the second coupling body 40 is a second directional arrow 48. In this embodiment, the directional arrows 38, 48 are of different colour or appearance. This facilitates assembly of the sexless couplings. Any suitable colour scheme or visual indicia can be used to facilitate connection of the Storz couplings. For example, a convention may be adopted that red-coloured arrows are on the side of the coupling facing the nozzle while yellow-coloured arrows are on the side of the coupling facing the hydrant or fire truck. As will be appreciate, any symbols, shading, lettering or other visual indicia may be added to further distinguish one side from the other.

The novel coupling disclosed herein can be used as part of a novel fire hose assembly. The assembly has a first fire hose 36 having a first coupling 30, wherein the first coupling comprises a body having a recessed portion formed in an outer surface of the body, the recessed portion shaped to define a visuotactile directional indicator. The assembly also has a second fire hose 46 having a second coupling 40 adapted to be mechanically coupled to the first coupling.

The novel coupling disclosed herein can also be used in a novel method of indicating a direction of exit when assembling fire hoses. The method entails providing a first fire hose having one end adapted to connect to a fire truck and another end having a first coupling and providing a second fire hose having a nozzle at one end and a second coupling at another end that is adapted to be mechanically coupled to the first coupling. One or both of the first coupling and the second coupling comprises a visuotactile directional indicator formed as a recessed portion in an outer surface of a body of the coupling. The method then involves coupling the first and second couplings such that the one or more directional indicators points toward the fire truck, thereby indicating the direction of exit.

The coupling, assembly and method confer advantages over the prior art. The coupling has a visuotactile directional indicator that formed as a recessed portion in the annular body of the coupling. As such, the coupling is less likely to catch or snag as the hose assembly is dragged through a building. The recessed portion defining the visuotactile directional indicator may have a light-reflecting surface (e.g. high-reflectivity coating, tape, film, etc.) that enhances visibility. Since this light-reflecting surface is protected within the recessed portion, it does not abrade or wear when the hose and coupling assembly is dragged over the ground or floor, thus preserving the reflectivity of the light-reflecting surface of the directional indicator. This improved coupling is therefore safer and easier to utilize since it is less likely to cause the hose and coupling assembly to catch or snag when being dragged through a flaming building. Furthermore, the visuotactile directional indicators on this improved coupling are more resistant to wear and abrasion, thus prolonging the coupling's usefulness as a visuotactile indicator in conditions in poor visibility.

This new technology has been described in terms of specific examples, embodiments, implementations and configurations which are intended to be exemplary only. Persons of ordinary skill in the art will appreciate that obvious variations, modifications and refinements can be made without departing from the scope of the present invention. The scope of the exclusive right sought by the Applicant is therefore intended to be limited solely by the appended claims.

What is claimed:
1. A coupling comprising:
an annular coupling body having a first annular portion and a second annular portion, wherein the second annular portion is configured to swivel relative to the first annular portion, and wherein the second annular portion defines a coupler for connecting to another coupling;
a plurality of recessed portions formed in an outer surface of the first annular portion, the recessed portions being shaped to define visuotactile directional indicators for indicating a direction of exit; and
a plurality of lugs that extend radially outwardly from the second annular portion.
2. The coupling as claimed in claim 1 wherein the second annular portion comprises internal threads to thereby define a female coupling.
3. The coupling as claimed in claim 2 wherein the plurality of lugs comprises three equally spaced lugs.
4. The coupling as claimed in claim 1 wherein the plurality of lugs comprises three equally spaced lugs.
5. The coupling as claimed in claim 1 further comprising a hose connected to the first annular portion.
6. The coupling as claimed in claim 1 comprising three recessed portions each defining a respective visuotactile directional indicator.

* * * * *